United States Patent [19]

Faust et al.

[11] Patent Number: 5,750,306
[45] Date of Patent: May 12, 1998

US005750306A

[54] GRAFT COPOLYMERS AND COLORLESS, TRANSPARENT ELECTROPHOTOGRAPHIC TONERS COMPRISING THESE

[75] Inventors: Raimund Josef Faust; Danuta Eva Allen, both of Wiesbaden; Silvia Lutz, Mainz, all of Germany

[73] Assignee: Agfa-Gevaert AG, Leverkusen, Germany

[21] Appl. No.: 579,433

[22] Filed: Dec. 27, 1995

[30] Foreign Application Priority Data

Dec. 29, 1994 [DE] Germany ............... 44 47 106.8

[51] Int. Cl.$^6$ .................................. G03G 9/13
[52] U.S. Cl. ........................... 430/115; 430/114
[58] Field of Search ......................... 430/112, 114, 430/115

[56] References Cited

U.S. PATENT DOCUMENTS

| | | | |
|---|---|---|---|
| 3,880,656 | 4/1975 | Nagashima et al. | 93/1.2 |
| 4,148,968 | 4/1979 | Nagashima et al. | 428/454 |
| 5,334,475 | 8/1994 | Kato | 430/114 |
| 5,478,688 | 12/1995 | Spiewak et al. | 430/114 |
| 5,565,297 | 10/1996 | Larson et al. | 430/114 |

FOREIGN PATENT DOCUMENTS

| | | |
|---|---|---|
| 0 066 955 | 12/1982 | European Pat. Off. |
| 2 248 191 | 4/1973 | Germany . |
| 1-142688 | 6/1989 | Japan . |
| 2-140757 | 5/1990 | Japan . |

*Primary Examiner*—John Goodrow
*Attorney, Agent, or Firm*—Foley & Lardner

[57] ABSTRACT

A graft copolymer of recurring units of ($C_6$–$C_{18}$)alkyl (meth)acrylate (A), N-vinylpyrrolidone (B), glycidyl (meth)acrylate (C), and glycidyl (meth)acrylate units esterified with (meth)acrylic acid (D) onto which polymeric side chains of units of N-vinylpyrrolidone, ($C_1$–$C_3$)alkyl acrylate and, if appropriate, ($C_1$–$C_3$)alkyl methacrylate are grafted. The polymer is suitable as a binder for colorless, negatively chargeable liquid toners, in particular in combination with graft copolymers of ($C_1$–$C_6$)alkyl (meth)acrylate, ($C_6$–$C_{18}$) alkyl (meth)acrylate and units in which chains of N-vinylpyrrolidone units are grafted onto one of the units mentioned, as a charge control agent. After fixing of the electrophotographically produced toner image, the toners give colorless resist masks or printing screens with a high resistance toward etching agents and solvents.

18 Claims, No Drawings

GRAFT COPOLYMERS AND COLORLESS, TRANSPARENT ELECTROPHOTOGRAPHIC TONERS COMPRISING THESE

BACKGROUND OF THE INVENTION

1. Field of the Invention

The invention relates to graft copolymers and negatively controlled electrophotographic liquid toners which comprise these copolymers as binders.

2. Description of Related Art

Electrophotographic liquid toners are usually particles dispersed in a liquid of high electrical resistance. The main constituents of the particles is resinous polymeric binders, charge control substances, and colored pigments or dyestuffs. The dyestuffs or preferably colored pigments are in general necessary, since their purpose is visualization of latent images, for example, in customary electrophotographic copies. These dyestuffs or pigments often at the same time function as charge control substances, and for this reason are also necessary constituents of the toner.

No colored toners are necessary for certain uses of electrophotographic imaging processes, for example, for the production of printing plates or resist masks. The toner image here is used merely for production of image elements which accept printing ink or for imagewise covering of a surface as a protection against etching solutions or electroplating baths. Such colorless or white toners are already known.

JP-A Hei 1/142 688 describes white or transparent toners which comprise a polymeric binder, a charge control substance, a release agent and if appropriate a white pigment. Binders which are employed are, for example, polystyrene, styrene/butadiene or styrene/acrylic acid copolymers, polyethylene, ethylene copolymers, phenolic resins, epoxy resins, allylphthalate polymers, polyamides, polyesters and maleate resins. Positive charge control substances which are mentioned are organic compounds containing basic nitrogen atoms or fillers treated on the surface with such compounds, and negative charge control substances which are mentioned are compounds containing carboxyl groups. The toner images obtained with these toners are not sufficiently resistant toward aggressive chemicals and are not free from defects (pin-holes) and are thus only poorly suitable for use as resist materials.

Colorless toners are also described in JP-A 2/140 757. They are employed there as additives to colored toners. They comprise relatively high amounts of waxes and are therefore unsuitable for producing toner images for planographic printing formes or resist materials.

EP-A 66 955 and DE-A 22 48 191 describe colorless toners which comprise a compound which is capable of reacting to give a colored compound. These toners also do not have adequate resistance toward aggressive substances, such as etching agents.

SUMMARY OF THE INVENTION

One object of the invention is to provide polymers which are suitable as binders for negatively chargeable electrophotographic toners. It is also an object to provide polymers that can be processed in combination with suitable high molecular weight charge control substances in, for example, long-chain aliphatic hydrocarbons to give a stable toner dispersion from which, by an electrophotographic route, colorless transparent toner images can be deposited which can be fixed to a defect-free layer with good resistance toward aggressive chemicals and toward mechanical abrasion during planographic printing and which suffer no troublesome discoloration during fixing or burning in of the toner image.

In accordance with these objectives, there is provided according to the present invention a graft copolymer of recurring units A, B, C, and D

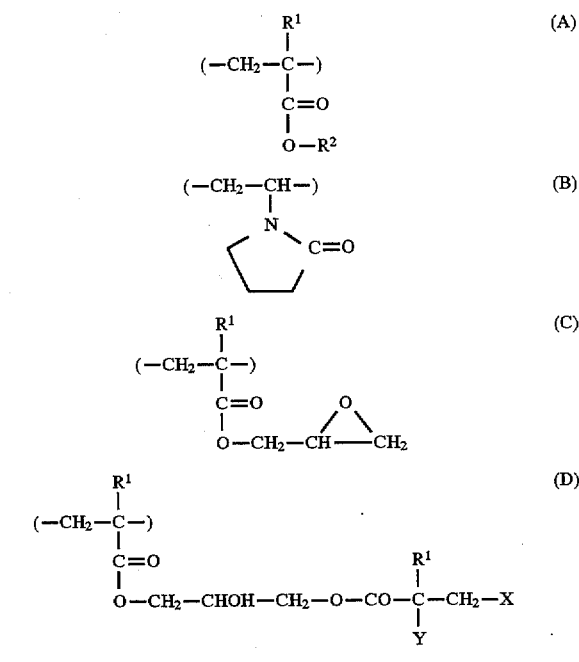

in which X and Y are initiator radicals or grafted-on polymeric radicals of units B and E

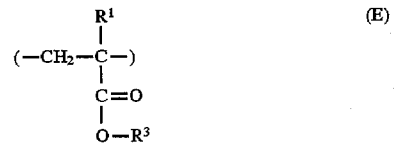

and not more than one of the radicals X and Y is an initiator radical, in which $R^1$ is a hydrogen atom or a methyl group, $R^2$ is an alkyl group having 6 to 18 carbon atoms and $R^3$ is an alkyl group having 1 to 3 carbon atoms and in at least some of the units E, $R^1$ is a hydrogen atom. $R^1$, $R^2$, and/or $R^3$ as well as the R groups discussed below can vary in the various recurring units.

Upon initiation of the graft polymerization, a radical of the thermally activatable polymerization initiator is linked to one of the double bond carbon atoms of the (meth)acryloyl radical of the unit from which D is formed by graft polymerization. On such addition to the double bond, the other carbon atom is converted to a free radical capable of starting the polymerization of unsaturated compounds to form a chain of units B and E. The polymerization initiator may be e.g. a peroxy or azo compound.

In accordance with the above objectives, there is also provided colorless and transparent, negative-working liquid toners which comprise a stable dispersion of a high molecular weight polymeric binder and a high molecular weight polymeric control agent, preferably in an aliphatic hydrocarbon, in which toner the binder is a graft copolymer of the abovementioned composition and the control agent is a desired agent and preferably a graft copolymer with units H, K, and, if desired, I, in which H corresponds to the formula

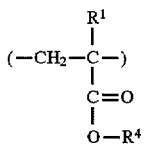

I corresponds to the formula

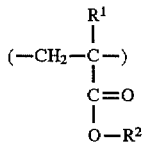

and

K corresponds to the formula

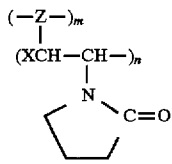

in which $R^1$, $R^2$ and X have the meaning given above, the R's can be identical or different in recurring units and the two $R^1$ can be identical or different, $R^4$ is an alkyl group having 1 to 6 carbon atoms, and Z is a radical formed by removal of a hydrogen atom from a unit H or I.

In accordance with the present invention, there is also provided methods of using the liquid toner defined above for the production of planographic printing plates or resist materials, such as etch or electroplating resists.

Further objects, features, and advantages of the present invention will become apparent from the detailed description of preferred embodiments that follows.

DETAILED DESCRIPTION OF THE PREFERRED EMBODIMENTS

In contrast to customary electrophotographic toners, the toners according to the invention are colorless and transparent, and they also comprise no constituents which are suitable and active for subsequent processing as color-forming agents. Their purpose is therefore to produce colorless toner images which are suitable as imagewise coverings or masks on surfaces to be modified, for example, as etch reserves, or as color-carrying image elements of a printing plate, in particular a planographic printing plate.

In the known colored toners, the content of pigment or dyestuff not only has the effect of imparting a desired coloration to the toner image; these constituents influence and also promote to a substantial extent the chargeability of the toner particles. If the colored pigments are omitted, the desired electrophotographic properties are therefore severely impaired.

As has now been found, an electrophotographic liquid toner having very good electrophotographic properties which can be processed to form toner images having outstanding resistance toward solvents and chemicals, for example, toward damping waters comprising alcohols in planographic printing or toward etching agents, can be prepared by using the novel graft copolymers as binders, preferably in combination with the abovementioned graft copolymers as charge control substances. The toners according to the invention furthermore have the property that they do not discolor in a troublesome manner during fixing by melting.

The graft copolymers according to the invention employed as binders include a number of different units. Their basic chain contains units A of alkyl (meth)acrylates having 6 to 18 carbon atoms in the alkyl group. These units promote the formation of stable emulsions. The basic chain furthermore contains units B, which are derived from N-vinyl-2-pyrrolidone and promote negative chargeability. It furthermore contains units C of (meth)acrylic acid esters having functional groups, via which linking with the grafted-on side chains takes place. These units are preferably glycidyl (meth)acrylate units. Such units are also still present in the finished graft polymer, since during the reaction with reactive compounds, in particular (meth) acrylic acid, onto which the grafted-on side chains later add, they are not completely reacted. Finally, the basic chain also contains those units which are formed from the glycidyl methacrylate units by reaction with functional compounds, in particular unsaturated carboxylic acids, and further polymerization thereof with unsaturated compounds to give polymeric side chains. The side chains in turn contain units of type B and units E of short-chain alkyl (meth)acrylates, at least some of the alkyl (meth)acrylate units are alkyl acrylate units.

The amounts of units A, B, C, and D in the basic chain can be varied as desired, and lie in general in the range from 50–100, preferably 60–80 parts by weight of A, 0.5–3.0, preferably 1–2 parts by weight of B, 0.5–4, preferably 1.5–3 parts by weight of C and 250–1000, preferably 350–600 parts by weight of D. The molecular weight $M_w$ of the total graft copolymer generally is within the range from 1.000 to 1.000.000, preferably from 2.000 to 200.000.

The graft copolymer binders according to the invention may be used in any desired application and are preferably used in toners, in combination with a control agent. Any desired control agent can be used. The charge control substances or control agents are preferably graft copolymers of units H, I, and K. The amounts of units H, I, and K can be chosen as desired and preferably lie in the range from 60 to 98, in particular 70 to 90% by weight of H, 0 to 30, in particular 5 to 20% by weight of I and 1 to 20, in particular 2 to 10% by weight of K.

The graft copolymers of the invention can be prepared in any desired manner, generally by conventional emulsion or suspension polymerization. Preferably, the graft copolymers employed as binders are expediently prepared in several stages. A polymer is first prepared by solution or emulsion polymerization of monomers which form the units A, B, and C. The polymerization is expediently carried out with free radical initiation and preferably in a solvent which is suitable as a dispersing agent for later use of the toner. The amount of monomers here generally lies in the range from 50–100, preferably 60–80 parts by weight of A, 0.5–3, preferably 1–2 parts by weight of B and 1–6, preferably 2–4 parts by weight of C. This terpolymer is reacted with acrylic or methacrylic acid in the presence of, for example, a tertiary amine in a second stage, the glycidyl group of unit C reacting with the carboxyl group of the (meth)acrylic acid to form an ester. The amounts in this stage are chosen such that the carboxyl groups are reacted completely and only some of the epoxide groups are esterified. In general, about 0.1 to 0.9, preferably 0.2 to 0.75 equivalent of acid are employed per equivalent of epoxide groups.

Finally, further monomers of types B and E are polymerized in the presence of the polymer with lateral (meth)acryloyloxy groups in a grafting polymerization reaction. A graft copolymer with grafted-on side chains of these units is formed by this reaction. The ratio of the amounts of units B and E in the side chain is in general chosen such that on average about 1–20 units of B and 250–500 units E are present per unit of (meth)acrylic acid.

Often, in addition to the grafted-on chains of B and E, a certain amount of independent copolymers of B and E which are not bonded to the basic polymer of A, B, C, and D is also formed. Their presence does not interfere with the usefulness of the polymerization product as long as graft polymers are formed to a significant extent. This is ensured if the preparation is carried out in the manner described, i.e., if polymers with lateral (meth)acryloyl groups are available as starting sites for a polymerization in the last stage of the polymerization.

In the binder copolymer, copolymers in which the units B and E continue the basic chain, are sometimes grafted laterally onto units of the basic chain and sometimes form separate copolymers in the second stage.

The graft copolymers which preferably serve as charge control substances are generally prepared in an analogous manner, but the stage of addition of (meth)acrylic acid onto an epoxide group is omitted. The polymerization is advantageously carried out in solution or emulsion in an inert solvent, preferably an aliphatic or aromatic hydrocarbon. It is in general carried out in the same manner as for the preparation of the binder.

To prepare the toner according to the invention, the finished graft copolymer binders are generally mixed with charge control substances preferably polymeric agents of the abovementioned composition. Mixing is carried out as desired and most expediently by mixing of the stable dispersions obtained in a hydrocarbon as the solvent or dispersing agent during the polymerization in the desired ratio of amounts and if necessary by dilution with further solvent.

In the copolymers of the invention, in unit A, $R^2$ is an alkyl radical having 6 to 18, preferably 8 to 15 carbon atoms; and $R^3$ is preferably a methyl group.

As mentioned above, the liquid toner according to the invention is prepared by mixing binder and control agent, advantageously in the form of the stable dispersions in hydrocarbons obtained during the polymerization. Any desired dispersing agent may be used. Dispersing agents which are preferably employed are aliphatic hydrocarbons having about 8 to 15 carbon atoms. The amounts of binder and control substance are in general in the range from 80–99, preferably 85–96% by weight of binder and 1–20, preferably 4–15% by weight of control agent, based on the total solids content. The ready-to-use toners in general have a solids content of about 0.5–10, preferably 0.8–5% by weight.

The toners according to the invention are distinguished by the fact that they have a negative chargeability at the required level without addition of colored pigments or dyestuffs. They also require no low molecular weight charge control agents and, after fixing to give the toner image, they therefore have a particularly good resistance toward etching agents and organic solvents, features which render them outstandingly suitable for use as resist masks and for planographic printing plates. Because of their colorlessness and transparency, which are also retained after fixing, they are also suitable for the production of colored images by imagewise covering of a colored layer and removal of the exposed areas of the layer by washing out or etching. These advantages are achieved by combination of the specific polymeric binders and charge control agents described above.

The following examples explain preferred embodiments of the invention. The examples are for illustrative purposes only and do not limit the scope of the invention.

EXAMPLE 1

Synthesis of a graft polymer as a binder Reaction stage 1

72 g of 2-ethylhexyl methacrylate, 1.2 g of N-vinyl-2-pyrrolidone, 2.7 g of glycidyl methacrylate, 1.0 g of azoisobutyronitrile and 125 g of Isopar H (mixture of branched $C_{10}$- to $C_{12}$-paraffin hydrocarbons, boiling range 179°–192° C.; flashpoint 58° C.) were initially introduced into a three-necked flask with a reflux condenser, gas inlet tube and stirrer and were polymerized under extra pure nitrogen; for this, the mixture was heated to 90° C. with a heating bath and polymerized at 90° C. for 6 hours, while stirring. After cooling, the mixture was aerated, 100 ml of Isopar H were added and some (100 ml) of the solvent was then distilled off in vacuo under 20 mbar in order to remove residual monomers. The polymer solution thus obtained was colorless and transparent in appearance and slightly viscous.

Reaction stage 2

The intermediate product obtained from reaction stage 1 was reacted with methacrylic acid in a three-necked flask with a reflux condenser, gas inlet tube and stirrer. For this, 200 g of the intermediate product were first initially introduced into the flask and heated to 90° C., and 0.16 g of dimethylaminododecane and, after 30 minutes, 0.42 g of methacrylic acid were added. After a total reaction time of 14 hours at 90° C., a colorless, transparent reaction product was obtained.

Viscosity: 89 to 105 mPa.s

Solids: 40% by weight

Reaction stage 3

29.0 g of the product from reaction stage 2, 54 g of methyl acrylate, 27 g of methyl methacrylate, 5.0 g of N-vinyl-2-pyrrolidone, 0.4 g of tert-dodecylmercaptan and 0.9 g of azoisobutyronitrile were initially introduced into a three-necked flask with a ref lux condenser, gas inlet tube and stirrer under extra pure nitrogen and were heated to an internal temperature of 90° C. Polymerization was carried out at 90° C. for 7 hours; a further 0.8 g of azoisobutyronitrile was then added and polymerization was carried out again at 90° C. for 5 hours. After cooling, the mixture was aerated, 100 ml of Isopar H were added and some of the solvent (100 ml) was removed by distillation in vacuo in order to remove residual monomers. A milky-white reaction product was obtained. (Solution A)

Viscosity: 3.2 to 3.6 mPa.s at 30% by weight of solids

Conductivity: 7 to $10 \times 10^{-12}$ Siemens/cm

Synthesis of a polymeric control agent 85 g of lauryl methacrylate, 15 g of methyl methacrylate and 0.5 g of azoisobutyronitrile in 300 g of Isopar H were polymerized in a three-necked flask with a reflux condenser, dropping funnel with pressure compensation and gas inlet tube and stirrer under extra pure nitrogen at 80° C. After 4 hours, a further 0.5 g of azoisobutyronitrile was added and the entire mixture was polymerized at 80° C. for a further 4 hours. 6.0 g of N-vinyl-2-pyrrolidone were now added to this copolymer solution and polymerization was carried out again at 100° C. under extra pure nitrogen. After 8 hours, a graft polymer of polymer type B was obtained. 100 ml of Isopar H were added to this polymer and 50 ml of the solvent were distilled off under 20 mbar; contents of residual monomers were removed in this manner. After a gravimetric determination of the solids, Isopar H was then added in an amount such that a solids content of graft polymer of 18.5% by weight was obtained. (Solution B)

Preparation of a colorless liquid toner

Preparation of the liquid concentrate

The toner concentrate was prepared by mixing 66.9 g of solution A, 7.03 g of solution B and, 235 g of Isopar G.

For this, solution A and solution B were first stirred at 60° C. for 1 hour and, after cooling, Isopar G was added and the mixture was stirred again for 5 minutes.

Preparation of the toner by dilution 4 parts by volume of Isopar G were added to 1 part by volume of liquid concentrate and the mixture was stirred at room temperature for 5 minutes.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A colorless, transparent negatively chargeable liquid toner comprising a stable dispersion of a graft copolymer comprising recurring units A, B, C, and D in the main chain

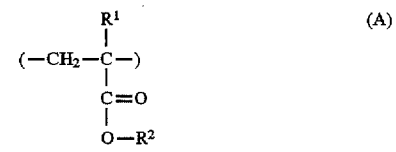 (A)

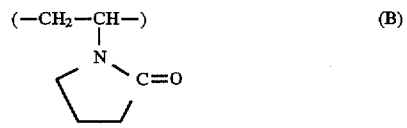 (B)

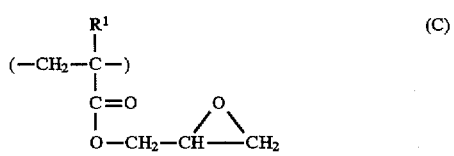 (C)

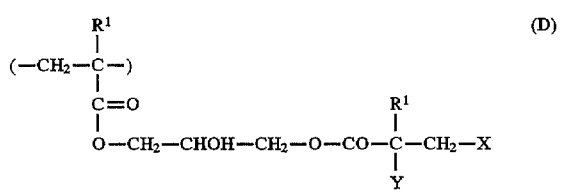 (D)

in which X and Y are initiator radicals or grafted-on polymeric radicals of units B and E

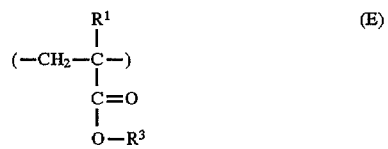 (E)

and not more than one of the radicals X and Y is an initiator radical, wherein $R^1$ is a hydrogen atom or a methyl group, $R^2$ is an alkyl group having 6 to 18 carbon atoms and $R^3$ is an alkyl group having 1 to 3 carbon atoms and in at least some of the units E, $R^1$ is a hydrogen atom, in a liquid dispersant.

2. A liquid toner as claimed in claim 1, wherein the parts by weight units in the main chain of the graft copolymer are: 50–100 parts by weight of A, 0.5–3 parts by weight of B, 0.5–4 parts by weight of C, and 250–1000 parts by weight of D.

3. A liquid toner as claimed in claim 1, wherein the main chain of the graft copolymer comprises 60–80 parts by weight of A, 1–2 parts by weight of B, 1.5–3 parts by weight of C, and 350–600 parts by weight of D.

4. A liquid toner as claimed in claim 1, which is prepared by polymerizing monomers that form units A, B, and C to form a terpolymer, reacting the terpolymer with monomers to form units D, and polymerizing monomers to give the B and E grafted-on units.

5. A liquid toner as claimed in claim 1, wherein the grafted-on polymeric radicals comprise 1–20 units of B and 250–500 units of E per unit of (meth)acrylic acid.

6. A liquid toner as claimed in claim 1, wherein $R^2$ is an alkyl radical having 8–15 carbon atoms and $R^3$ is a methyl group.

7. A liquid toner as claimed in claim 1 wherein the stable dispersion comprises a polymeric control agent that comprises a polymer with units H, K, and, optionally, I, wherein H corresponds to the formula

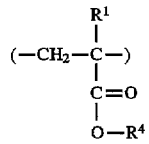

I corresponds to the formula and

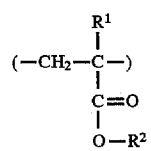

K corresponds to the formula

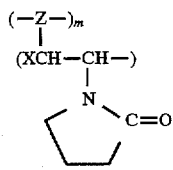

in which
R$^1$, R$^2$, and X have the meaning given in claim 1, the two R$^1$ can be identical or different,
R$^4$ is an alkyl group having 1 to 6 carbon atoms and
Z is a radical formed by removal of a hydrogen atom from a unit H or I.

8. A liquid toner as claimed in claim 7, wherein the control agent comprises, by weight of the control agent, 60–98% by weight of H, 0–30% by weight of I, and 1–20% by weight of K.

9. A liquid toner as claimed in claim 8, wherein the control agent comprises, by weight of the control agent, 70–90% by weight of H, 5–20% by weight of I, and 2–10% by weight of K.

10. A liquid toner as claimed in claim 7, in which the ratio of m:n is 1:20 to 20:1.

11. A liquid toner as claimed in claim 1, wherein the dispersant comprises a liquid aliphatic hydrocarbon that has 8–15 carbon atoms.

12. A liquid toner as claimed in claim 7, comprising 80–99% by weight of the graft copolymer and 1–20% by weight of the control agent, based on the weight of total solids in the toner.

13. A liquid toner as claimed in claim 7, which has 0.5–10% by weight of solids.

14. A liquid toner as claimed in claim 1, further comprising a charge control agent.

15. A liquid toner as claimed in claim 1, wherein the dispersant comprises an aliphatic hydrocarbon.

16. A liquid toner as claimed in claim 7, wherein the dispersant comprises an aliphatic hydrocarbon.

17. A liquid toner as claimed in claim 1, further comprising a polymeric control agent.

18. A liquid toner as claimed in claim 1, wherein the graft copolymer has a weight average molecular weight from 1,000 to 1,000,000.

* * * * *